(12) United States Patent
Sugimoto et al.

(10) Patent No.: US 6,875,527 B2
(45) Date of Patent: Apr. 5, 2005

(54) INFORMATION RECORDING MEDIUM AND INFORMATION STORING DEVICE

(75) Inventors: Toshio Sugimoto, Kawasaki (JP); Takuya Uzumaki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 36 days.

(21) Appl. No.: 10/316,643

(22) Filed: Dec. 11, 2002

(65) Prior Publication Data

US 2003/0169615 A1 Sep. 11, 2003

(30) Foreign Application Priority Data

Dec. 27, 2001 (JP) .......................... 2001-397814

(51) Int. Cl.[7] .................. G11B 5/66; G11B 5/70
(52) U.S. Cl. .................. 428/694 TS; 428/694 TM; 428/336; 428/900
(58) Field of Search .................. 428/694 TM, 694 TS, 428/336, 694 SC, 694 MT, 694 RE, 900

(56) References Cited

U.S. PATENT DOCUMENTS

| | | | |
|---|---|---|---|
| 5,663,935 A | 9/1997 | Nishimura | 369/13 |
| 5,717,662 A * | 2/1998 | Nishimura | 369/13.44 |
| 6,483,653 B1 * | 11/2002 | Katayama et al. | 360/59 |
| 2003/0017364 A1 * | 1/2003 | Kikitsu et al. | 428/693 |

FOREIGN PATENT DOCUMENTS

| | | |
|---|---|---|
| EP | 0 225 141 | 6/1987 |
| EP | 642 125 | 3/1995 |
| EP | 1 059 629 | 12/2000 |
| JP | 2-227814 | 9/1990 |
| JP | 2000-132824 | 5/2000 |
| JP | 2000-215431 | 8/2000 |
| JP | 2001-148109 | 5/2001 |

* cited by examiner

*Primary Examiner*—Holly Rickman
(74) *Attorney, Agent, or Firm*—Greer, Burns & Crain, Ltd.

(57) ABSTRACT

A perpendicular magnetic recording medium including a substrate, a soft-magnetic backing layer formed on the substrate, a magnetic recording layer having perpendicular magnetic anisotropy formed on the backing layer, and a leakage magnetic field control layer having ferrimagnetism formed on the magnetic recording layer. The leakage magnetic field control layer is exchange-coupled to the magnetic recording layer antiferromagnetically or ferrimagnetically to thereby suppress the influence of leakage magnetic fields from the backing layer and the magnetic recording layer and reduce the medium noise.

6 Claims, 9 Drawing Sheets

THICKNESS OF EXCHANGE COUPLING CONTROL LAYER (nm)

INFORMATION RECORDING MEDIUM AND INFORMATION STORING DEVICE

BACKGROUND OF THE INVENTION

1. Field of the Invention

The present invention relates generally to an information recording medium, and more particularly to a perpendicular magnetic recording medium having a perpendicularly magnetized film.

2. Description of the Related Art

With a reduction in size and an increase in capacity of a magnetic disk drive, it has recently been desired to reduce the grain size of magnetic particles in a recording medium. In a conventional recording method referred to as an in-plane (longitudinal) recording method, it is difficult to greatly reduce the grain size of magnetic particles because of thermal instability. Accordingly, a perpendicular magnetic recording method superior to the in-plane recording method in thermo-magnetic relaxation or the like has recently been investigated. A general perpendicular magnetic recording method employs a dual-layer medium fabricated by forming a soft-magnetic backing layer (base layer) on a substrate and forming a perpendicularly magnetized film on the soft-magnetic backing layer with a nonmagnetic layer interposed therebetween.

In a perpendicular magnetic recording medium for a hard disk, the use of a multilayer film of Co/Pd or Co/Pt as the perpendicularly magnetized film is being investigated. This multilayer film is formed by alternately depositing very thin magnetic films each having a thickness of 0.05 to 2 nm and very thin nonmagnetic films each having a thickness of 0.1 to 5 nm. As compared with a conventional recording medium using Co—Cr based alloy, this multilayer film exhibits much stronger perpendicular magnetic anisotropy, and it is therefore a promising candidate for the perpendicularly magnetized film.

However, the above-mentioned multilayer film has the following problems.

(1) Large Medium Noise Due to a Continuous Film

The medium noise is caused mainly by transition noise or reverse magnetic domain noise accompanying magnetization reversal. The transition noise originates from grain boundary noise by magnetic crystalline particles or nonuniformity of magnetization reversal near the boundary of a recorded magnetic domain. The reverse magnetic domain noise is due to nonuniformity of magnetic particles, demagnetizing fields in a recording film, or leakage magnetic fields from the periphery of a recorded magnetic domain. A general measure against this medium noise is to form a film structure so that adjacent magnetic particles are magnetically isolated from each other. By such magnetic isolation of the adjacent magnetic particles, the medium originated noise (medium noise) can be reduced to improve an S/N and accordingly improve a linear recording density.

The magnetic characteristics of the medium are largely changed by magnetically isolating the adjacent magnetic particles. That is, the coercive force is increased, and the slope $\alpha$ ($=4\pi dM/dH$) near the coercive force in an M-H loop is decreased ($\alpha=1$ in an ideal condition). As a technique for magnetically isolating the adjacent magnetic particles in the Co/Pd or Co/Pt multilayer magnetic film, a method of depositing films by sputtering under high pressures of gases or a method of using a granular base layer is known. However, even though these methods are used, it is not easy to form a single magnetic domain. Further, the control of magnetic characteristics by only one recording film is difficult.

(2) Increase in Noise by the Backing Layer

Since the backing layer itself is formed of a magnetic material, a magnetic flux originating from the magnetization in the backing layer is superimposed on a reproduced signal by a head and accordingly becomes a noise source. The backing layer is a soft-magnetic film having a coercive force (Hc) of several oersteds (Oe), so that it is susceptible to an external magnetic field. Accordingly, a leakage magnetic field from the backing layer is superimposed on a recording magnetic field from a recording head. As a result, uniform perpendicular magnetic recording cannot be attained because of the leakage magnetic field from the backing layer as a noise source. A general measure for reducing the noise due to the backing layer is to form a magnetic domain control layer as an antiferromagnetic film adjacent to the backing layer, thereby controlling magnetic domains in the backing layer. However, the noise cannot be sufficiently reduced by this method.

SUMMARY OF THE INVENTION

It is therefore an object of the present invention to provide a perpendicular magnetic recording medium which can reduce the noise due to the leakage magnetic fields from the magnetic recording layer and the backing layer.

In accordance with an aspect of the present invention, there is provided an information recording medium comprising a substrate; a ferromagnetic recording layer formed on the upper side of said substrate, said ferromagnetic recording layer having perpendicular magnetic anisotropy; and a ferrimagnetic layer formed on at least one of the upper and lower sides of said ferromagnetic recording layer, said ferrimagnetic layer exhibiting magnetization opposite to the magnetization of said ferromagnetic recording layer in its magnetized condition.

Preferably, the ferrimagnetic layer is formed from a rare earth-transition metal amorphous alloy film. The rare earth-transition metal amorphous alloy film contains gadolinium (Gd) as a rare earth metal. Preferably, the ferrimagnetic layer has a thickness of 20 nm or less. The ferromagnetic recording layer is formed from a multilayer magnetic film of Co/Pd, Co/Pt, or CoB/PdB, for example. Preferably, an exchange coupling control layer for controlling an exchange coupling force between the ferromagnetic recording layer and the ferrimagnetic layer is interposed between the ferromagnetic recording layer and the ferrimagnetic layer. Preferably, the exchange coupling control layer has a thickness of 10 nm or less.

In accordance with another aspect of the present invention, there is provided an information storing device having an information recording medium comprising a substrate; a ferromagnetic recording layer formed on the upper side of said substrate, said ferromagnetic recording layer having perpendicular magnetic anisotropy; and a ferrimagnetic layer formed on at least one of the upper and lower sides of said ferromagnetic recording layer, said ferrimagnetic layer exhibiting magnetization opposite to the magnetization of said ferromagnetic recording layer in its magnetized condition.

The above and other objects, features and advantages of the present invention and the manner of realizing them will become more apparent, and the invention itself will best be understood from a study of the following description and appended claims with reference to the attached drawings showing some preferred embodiments of the invention.

DETAILED DESCRIPTION OF THE PREFERRED EMBODIMENTS

Figure 1:
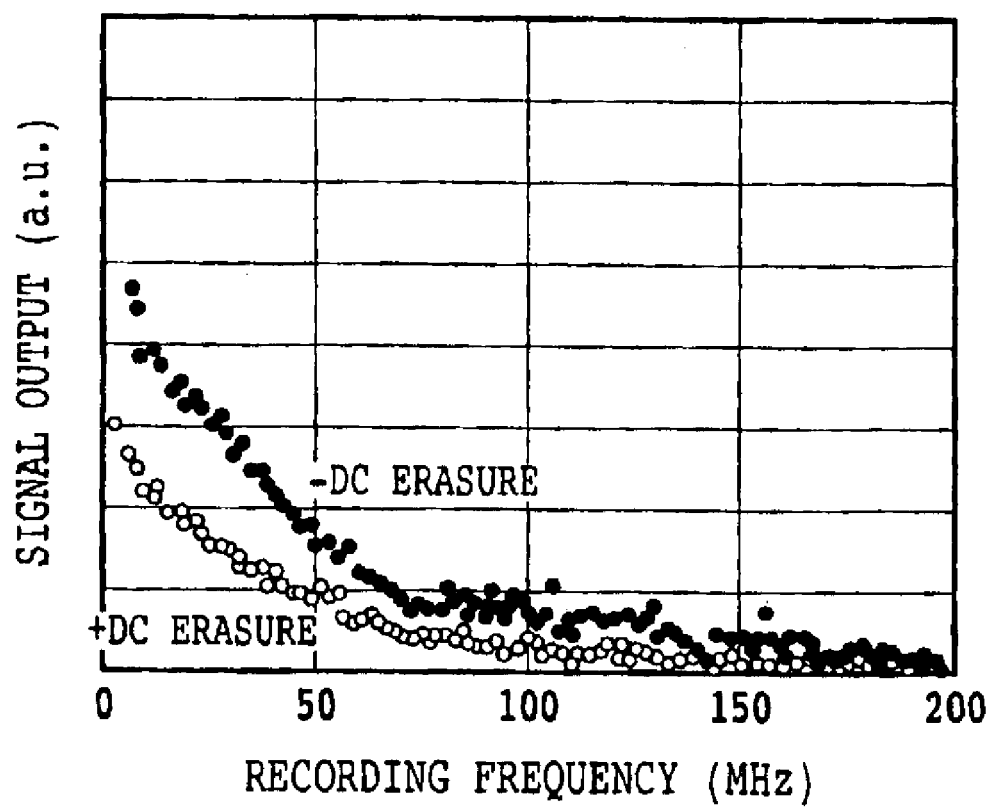
FIG. 1 is a graph showing the frequency characteristic of a dual-layer perpendicular magnetic recording medium.

There will first be examined the influences of leakage magnetic fields from a magnetic recording layer and a soft-magnetic backing layer constituting a dual-layer perpendicular magnetic recording medium. FIG. 1 is a graph showing the frequency characteristic of a duel-layer perpendicular magnetic recording medium consisting of a glass substrate, CoZrNd (100 nm) soft-magnetic backing layer, Pd nonmagnetic layer, CoB/PdB magnetic multilayer film, and C (5 nm) protective layer.

Figure 2A:
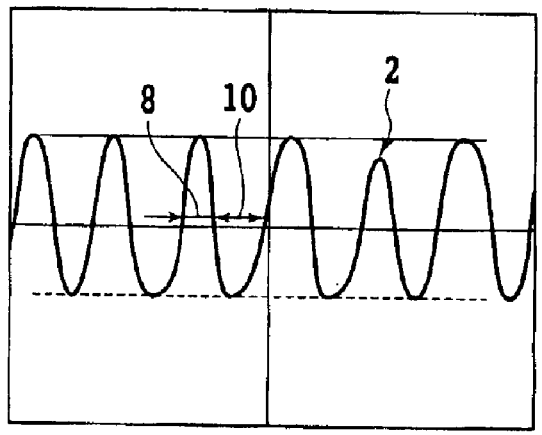
FIG. 2A is a waveform chart showing a frequency characteristic and a reproduced waveform according to the direction of erasure at a recording frequency of 30 MHz.
Figure 2B:
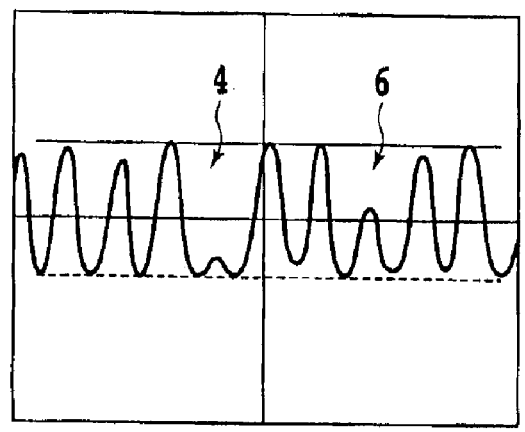
FIG. 2B is a waveform chart showing a frequency characteristic and a reproduced waveform according to the direction of erasure at a recording frequency of 50 MHz.

The graph of FIG. 1 shows changes in level of signal output with changes in recording frequency in the condition where the recording medium is magnetized uniformly in a positive or negative direction (initialization). As apparent from FIG. 1, the frequency dependence of signal output is different according to the direction of initialization. Further, as shown by an arrow 2 in FIG. 2A and arrows 4 and 6 in FIG. 2B, the higher the recording frequency, the more the unrecorded portions are present. Further, as shown by reference numerals 8 and 10 in FIG. 2A, the temporal widths of positive and negative signals recorded are different from each other. This means that the size of a recorded magnetic domain is different according to the direction of recording magnetization, and this is considered to be due to the influence of leakage magnetic fields from each magnetic layer to be hereinafter described.

Figure 3:
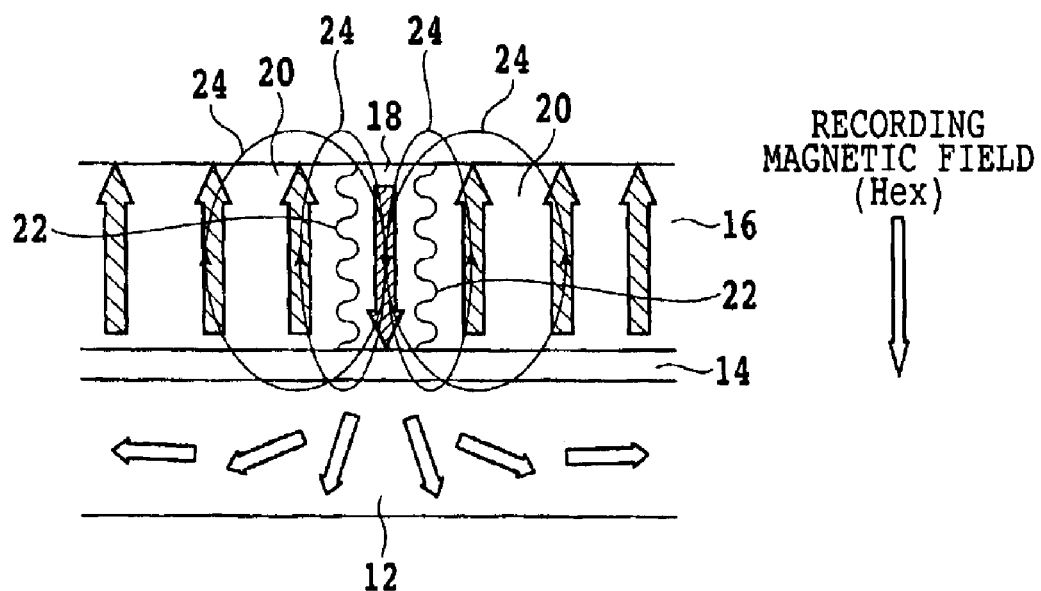
FIG. 3 is a schematic diagram showing the influence of leakage magnetic fields from a recording layer.

First, the influence of leakage magnetic fields from the perpendicular magnetic recording layer will be examined. FIG. 3 schematically shows the influence of leakage magnetic fields from the magnetic recording layer upon a recording magnetic field. A nonmagnetic layer 14 is formed on a soft-magnetic backing layer 12, and a magnetic recording layer 16 is formed on the nonmagnetic layer 14. Reference numeral 18 denotes a recorded domain (magnetic domain), and reference numerals 20 denote initialized domains. A magnetic domain wall or transition region 22 is formed between the recorded domain 18 and each initialized domain 20. Reference numerals 24 denote leakage magnetic fields from the recording layer 16.

As apparent from FIG. 3, the leakage magnetic fields 24 from the uniformly initialized regions 20 in the vicinity of the recorded magnetic domain (recorded domain) 18 to which a downward recording magnetic field (Hex) has been applied are superimposed so as to assist the downward recording magnetic field (Hex). In the case that an upward recording magnetic field (Hex) is applied, the leakage magnetic fields from the initialized regions 20 are superimposed so as to reduce the upward recording magnetic field (Hex). Accordingly, the recording magnetic field is not uniformly applied upward and downward, and the upward recorded magnetic domain and the downward recorded magnetic domain are different from each other in shape or size. As a result, the intensity of a reproduced signal or the medium noise increases.

Figure 4A:
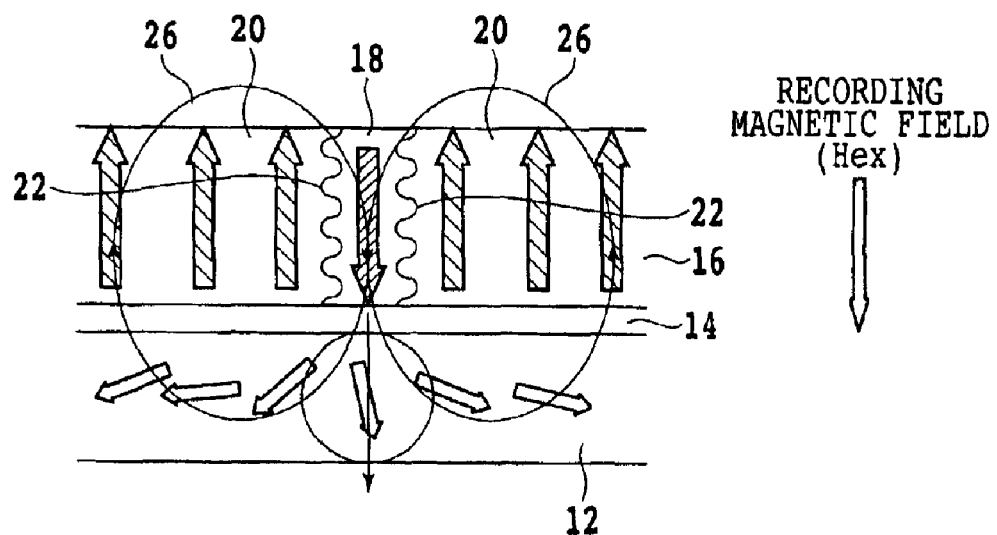
FIG. 4A is a schematic diagram showing the influence of leakage magnetic fields from a backing layer.

FIG. 4A schematically shows the influence of leakage magnetic fields 26 from the backing layer 12 upon a recording magnetic field. As the backing layer 12, a film having the following magnetic characteristics is generally used. The film as the backing layer 12 is an in-plane magnetized film, which is a soft-magnetic film having a coercive force (Hc) of tens of oersteds (Oe) or less. Further, since the backing layer 12 is not exchange-coupled to the magnetic recording layer 16, magnetization reversal easily occurs in the direction of application of an external magnetic field.

Further, since a large recording magnetic field is circulated through the recording layer, the saturation magnetization is large. In terms of magnetic flux density (Bs), a CoZrNd backing layer has a magnetic flux density of 1.1 tesla (T) or more, and an FeTaC backing layer has a magnetic flux density of 1.6 tesla or more. This suggests that the influence of leakage magnetic fields 26 from the backing layer 12 is possibly larger than that of leakage magnetic fields 24 from the recording layer 16.

Figure 4B:
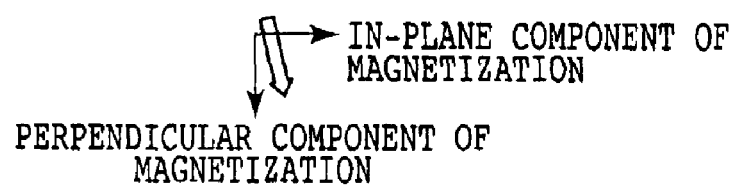
FIG. 4B is a schematic diagram illustrating a perpendicular component and an in-plane component of the magnetization in the backing layer.

Accordingly, when a recording magnetic field (Hex) greater than or equal to the coercive force (Hc) of the recording layer is applied, the magnetization in the backing layer 12 is forced to orient in the direction of application of the recording magnetic field, but cannot easily orient in the perpendicular direction because the backing layer 12 is an in-plane magnetized film, so that the magnetization orients obliquely as shown in FIG. 4A. As shown in FIG. 4B, the magnetization in the backing layer 12 in this case has a perpendicular component and an in-plane component, and the perpendicular component has an influence on the recording magnetic field. The influence of the perpendicular component upon the recording magnetic field is qualitatively the same in tendency as that of the leakage magnetic fields from the recording layer 16 mentioned above.

The principle of the present invention for relaxing the influence of leakage magnetic fields will now be described with reference to FIGS. 5 and 6. In the present invention, a leakage magnetic field control layer 28 showing ferrimagnetism is formed on the recording layer 16. As the leakage magnetic field control layer 28, a rare earth-transition metal amorphous alloy film of GdFeCo, for example, may be adopted. The transition metal (e.g., Co) in the recording layer 16 and the rare earth metal (e.g., Gd) in the leakage magnetic field control layer 28 are exchange-coupled with each other to thereby obtain the magnetization arrangement shown in FIGS. 5 and 6.

Figure 5:
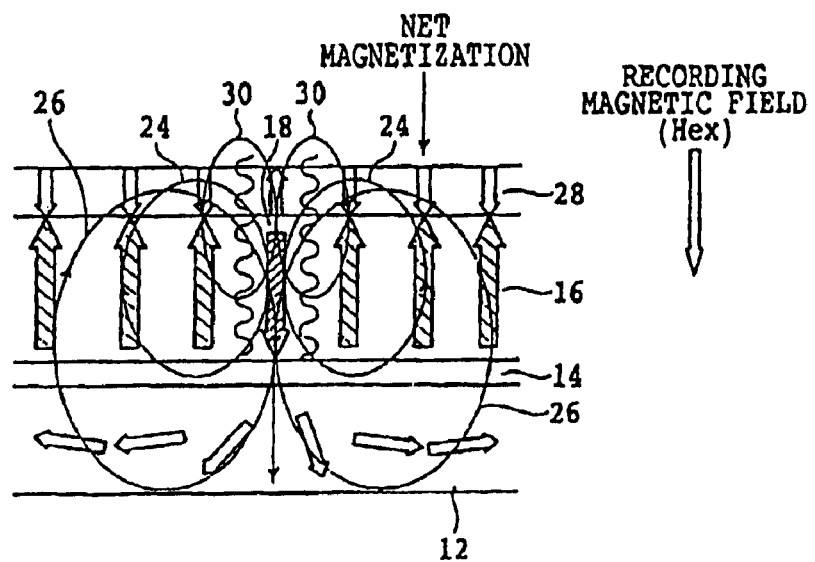
FIG. 5 is a schematic diagram illustrating the principle of the present invention in the case that the leakage magnetic fields from the recording layer and the backing layer assist a recording magnetic field.

FIG. 5 schematically shows the magnetization arrangement in the case that the leakage magnetic fields 26 and 24 from the backing layer 12 and the recording layer 16 assist the recording magnetic field. In this case, leakage magnetic fields 30 from the leakage magnetic field control layer 28 having ferrimagnetism function so as to cancel the leakage magnetic fields 26 and 24 from the backing layer 12 and the recording layer 16. That is, the recording layer 16 and the leakage magnetic field control layer 28 form the ferrimagnetic magnetization arrangement, so that the leakage magnetic fields 30 from the leakage magnetic field control layer 28 cancel the influence of the leakage magnetic fields 24 and 26 from the recording layer 16 and the backing layer 12. As a result, excess application of the recording magnetic field can be avoided.

Figure 6:
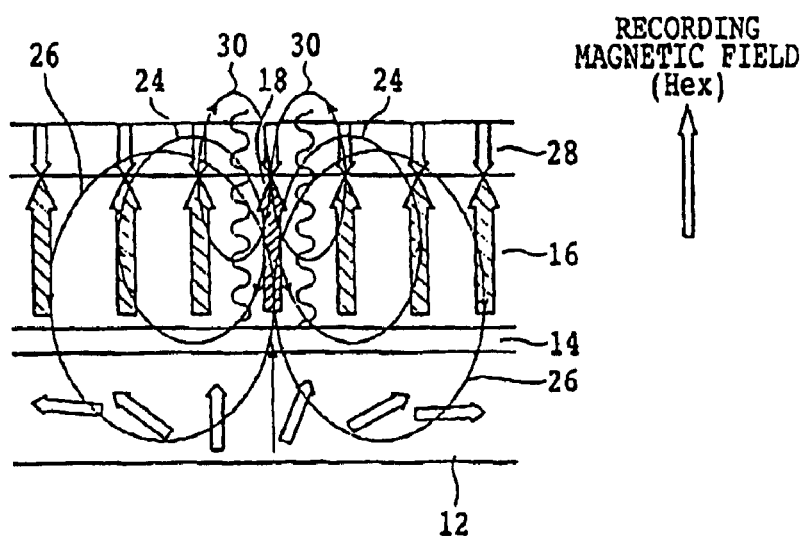
FIG. 6 is a schematic diagram illustrating the principle of the present invention in the case that the leakage magnetic fields from the recording layer cancel a recording magnetic field.

FIG. 6 schematically shows the magnetization arrangement in the case that the leakage magnetic fields 26 from the backing layer 12 assist the recording magnetic field and the leakage magnetic fields 24 from the recording layer 16 cancel the recording magnetic field. In this case, the leakage magnetic fields 30 from the leakage magnetic field control layer 28 function so as to cancel the leakage magnetic fields 26 from the backing layer 12. Thus, the leakage magnetic field control layer 28 having ferrimagnetism is formed on the recording layer 16 according to the present invention, thereby obtaining the effect that the influence of the leakage magnetic fields from the magnetic layers 12 and 16 can be reduced to thereby allow uniform application of the recording magnetic field irrespective of its application direction.

Figure 7:
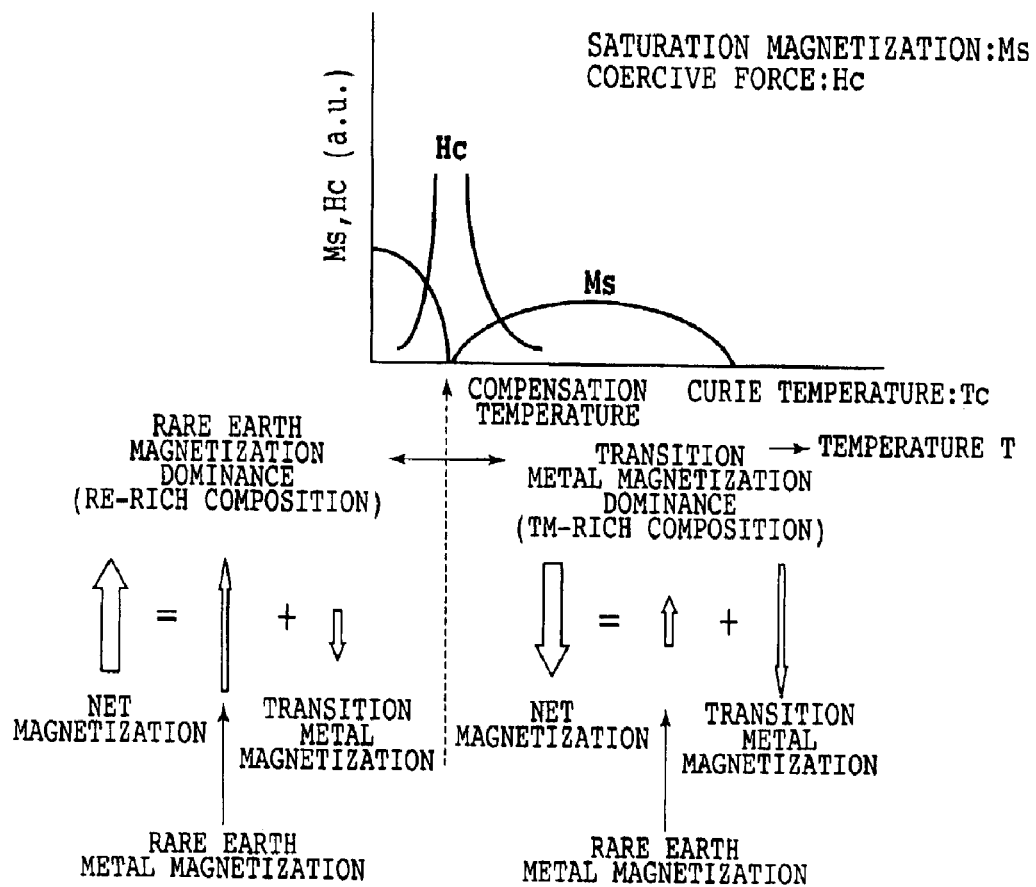
FIG. 7 is a schematic diagram showing the temperature dependence of saturation magnetization Ms and coercive force Hc of a leakage magnetic field control layer and also showing a magnetized condition of the leakage magnetic field control layer.

FIG. 7 shows magnetic characteristics of a rare earth-transition metal amorphous alloy film used for the leakage magnetic field control layer 28. By using a rare earth-transition metal amorphous alloy film for the leakage magnetic field control layer 28, the following effects can be obtained. As apparent from FIG. 7, the rare earth-transition metal amorphous alloy film has ferrimagnetism. In the case of rare earth magnetization dominance (RE rich composition), the net magnetization orients in the direction of magnetization of the rare earth metal, whereas in the case of transition metal magnetization dominance (TM rich composition), the net magnetization orients in the direction of magnetization of the transition metal.

In the TM rich composition of the rare earth-transition metal amorphous alloy film, this film is formed on the recording layer 16 so that the transition metal in this film and the transition metal in the recording layer 16 are exchange-coupled with each other, so that the magnetization in the leakage magnetic field control layer 28 is arranged antiferromagnetically with respect to the magnetization in the recording layer 16. In this case, the exchange coupling of the transition metals makes alignment of the magnetization in orientation, so that no perpendicular (interfacial) magnetic domain walls are generated and the magnetic domains are therefore stably present. In the case that the TM rich composition is changed into the RE rich composition, the rare earth metal (e.g., Gd) in the leakage magnetic field control layer 28 formed from a rare earth-transition metal amorphous alloy film and the transition metal (e.g., Co) in the recording layer 16 are exchange-coupled ferrimagnetically, so that the magnetic characteristics or magnetization arrangement in the leakage magnetic field control layer 28 can be controlled.

Since the amorphous alloy film is used as the leakage magnetic field control layer 28, this layer 28 is not susceptible to the crystallinity and orientation in the recording layer 16. Since this layer 28 is not a crystalline film, the grain boundary noise due to nonuniformity of magnetic particles, etc. can be reduced. By selecting an optimum element (e.g., Gd) as the rare earth element, the transition width of the magnetic film can be reduced. As a result, the transition noise due to magnetization transition (reversal) can be reduced. The transition width of the magnetic film is proportional to the exchange coupling force between the rare earth metal and the transition metal and to the perpendicular magnetic anisotropy of the magnetic film.

Some examples according to the present invention will now be described.

EXAMPLE 1

Figure 8:
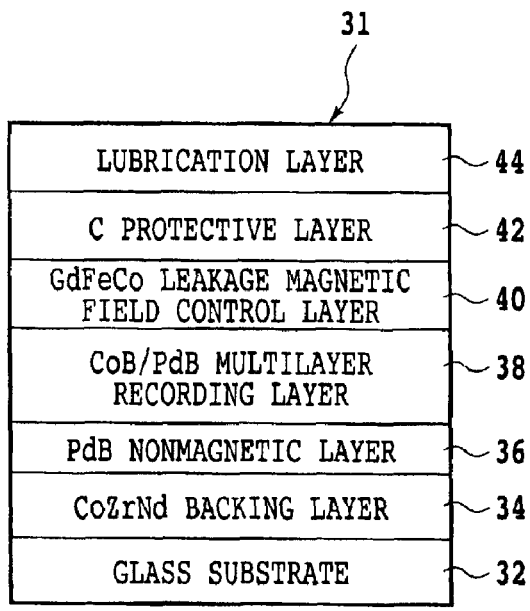
FIG. 8 is a schematic diagram showing the configuration of a recording medium in Example 1.

Referring to FIG. 8, reference numeral 31 generally denotes a perpendicular magnetic recording medium fabricated by a DC magnetron sputtering process. The perpendicular magnetic recording medium 31 was fabricated by depositing a CoZrNd backing layer 34, PdB nonmagnetic layer 36, CoB/PdB multilayer recording layer 38, GdFeCo leakage magnetic field control layer 40, and C protective layer 42 in this order on a glass substrate 32. The protective layer 42 was coated with a lubrication layer 44 for the purpose of evaluation of recording/reproducing characteristics by a magnetic head. As mentioned above, the recording layer 38 is a perpendicularly magnetized film, and the backing layer 34 is an in-plane magnetized film. Accordingly, if the recording layer 38 is formed directly on the backing layer 34, the recording layer 38 may be affected by the magnetic characteristics of the backing layer 34 to cause an increase in medium noise or susceptibility to thermal fluctuations.

To magnetically separate the recording layer 38 and the backing layer 34 from each other, the PdB nonmagnetic layer 36 was interposed between the recording layer 38 and the backing layer 34. Usable examples of the nonmagnetic layer for magnetically separating the recording layer 38 and the backing layer 34 include a single-element film of metalloid such as boron (B), carbon (C), and silicon (Si), and an alloy film (e.g., PdB) or oxide film containing at least one kind of metalloid. The recording medium in Example 1 has a specific configuration of C (5 nm)/GdFeCo (5 nm)/CoB/PdB multilayer film/CoZrNd (100 nm)/glass substrate. As a comparison, another recording medium having a configuration of C (5 nm)/CoB/PdB multilayer film/CoZrNd (100 nm)/glass substrate was prepared.

In evaluating the electrical-magnetic characteristics of the above recording media in Example 1 and in Comparison, a magnetic head having the following design was used. That is, the magnetic head used is composed of a recording head whose track width (recording width) and gap length are 2 $\mu$m and 0.3 $\mu$m, respectively, and a reproducing head whose track width and gap length are 1 $\mu$m and 0.2 $\mu$m, respectively. The linear velocity for recording and reproduction was set to 5 m/s.

Figure 9:
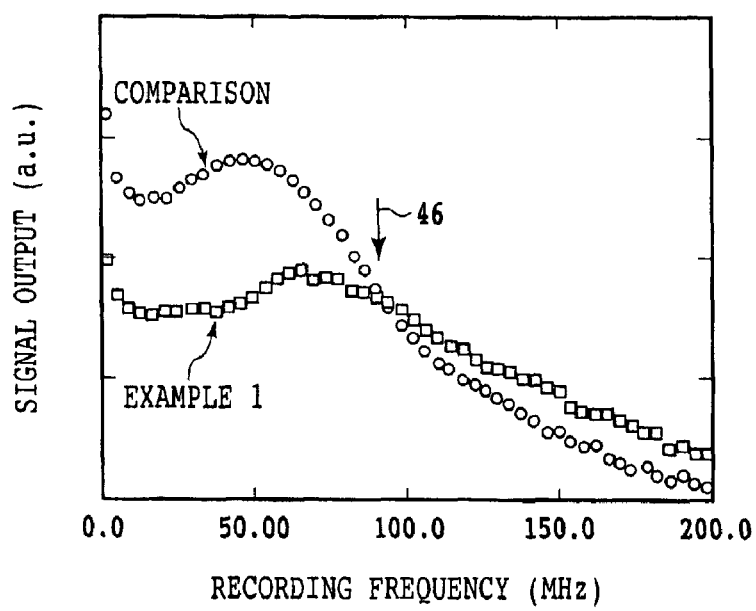
FIG. 9 is a graph showing the recording frequency dependence of signal output.

FIG. 9 shows changes in level of signal output with changes in recording frequency by the use of the recording media in Example 1 and in Comparison. As apparent from FIG. 9, the recording medium in Example 1 can provide signal outputs of a predetermined level or higher over a wide frequency range. To the contrary, the recording medium in Comparison has a disadvantage such that the signal output is extremely degraded at higher recording frequencies. This result shows that the recording medium in Example 1 is improved in frequency characteristic over the recording medium in Comparison.

Further, an S/N was evaluated near 100 MHz where the signal output by the recording medium in Example 1 is substantially equal to the signal output by the recording medium in Comparison as shown by an arrow 46. As the result of this evaluation, it was confirmed that the S/N of the recording medium in Example 1 was higher by about 3 dB than that of the recording medium in Comparison owing to the reduction in medium noise.

EXAMPLE 2

Figure 10:
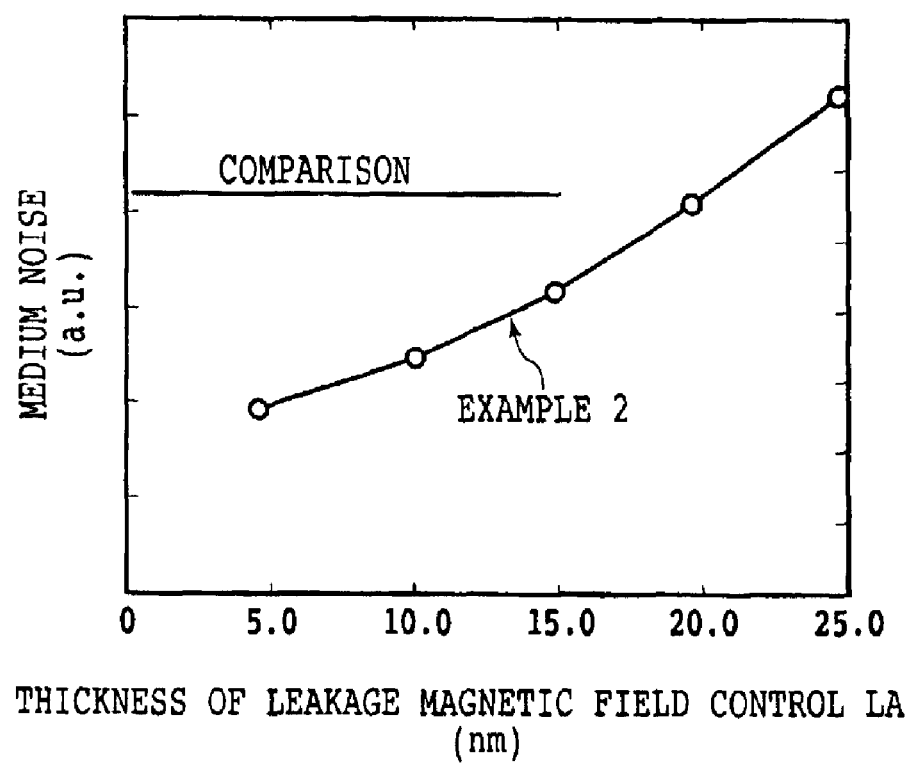
FIG. 10 is a graph showing the dependence of medium noise upon the thickness of a leakage magnetic field control layer in Example 2.

A recording medium having the same configuration as that of the recording medium in Example 1 was prepared with the thickness of the GdFeCo leakage magnetic field control layer 40 being changed in the range of 5 to 25 nm. By using these test samples of the recording medium, the S/N characteristics at a recording frequency of 5 MHz were evaluated. The result of this evaluation is shown in FIG. 10. As apparent from FIG. 10, the medium noise monotonically increases with an increase in the thickness of the GdFeCo layer, and when the thickness of the GdFeCo layer becomes about 20 nm, the medium noise is substantially the same as that of the recording medium in Comparison. Accordingly, it is preferable to set the thickness of the GdFeCo leakage magnetic field control layer 40 to not greater than 20 nm.

EXAMPLE 3

Figure 11:
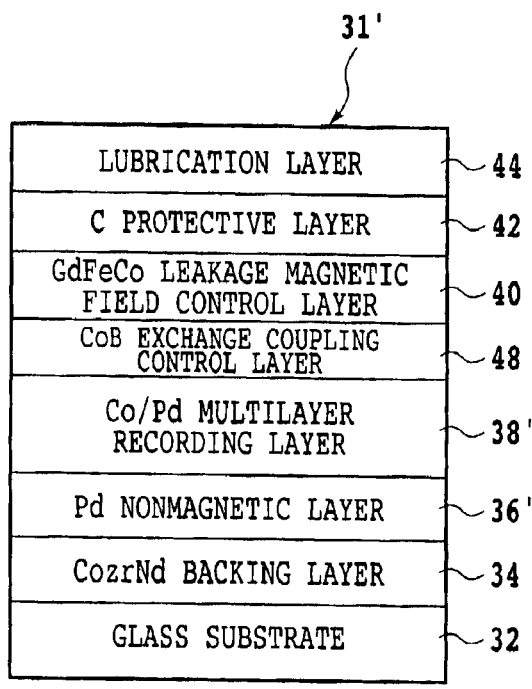
FIG. 11 is a schematic diagram showing the configuration of a recording medium in Example 3.

A perpendicular magnetic recording medium 31' having a configuration shown in FIG. 11 was prepared to control the exchange coupling force between the GdFeCo leakage magnetic field control layer 40 and the recording layer 38 shown in FIG. 8. That is, a CoB exchange coupling control layer 48 was interposed between a recording layer 38' and the leakage magnetic field control layer 40. By using this recording medium 31', the characteristic was evaluated. As the recording layer 38', a Co/Pd multilayer film was used. The thickness of the GdFeCo leakage magnetic field control layer 40 was set to nm. As the exchange coupling control layer 48, a CoB film was used, in which the content of boron (B) was set to 8 at %.

Figure 12:
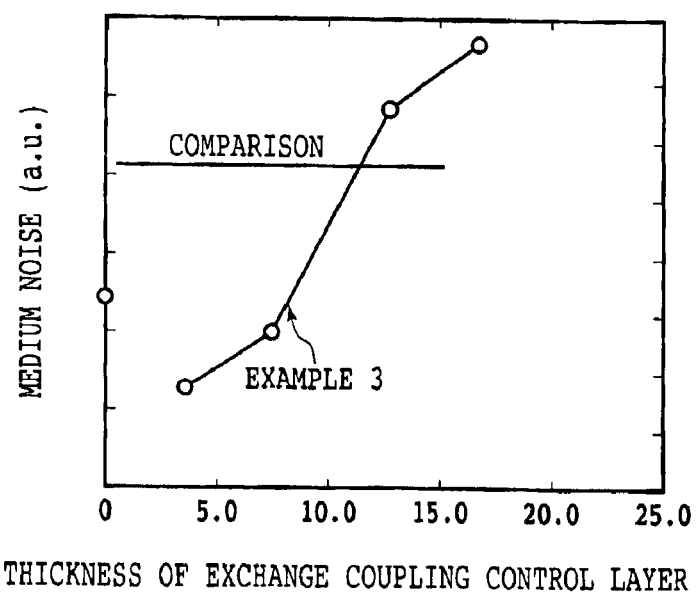
FIG. 12 is a graph showing the dependence of medium noise upon the thickness of an exchange coupling control layer in Example 3.

FIG. 12 shows the dependence of the medium noise upon the thickness of the exchange coupling control layer 48. As a comparison, a recording medium having a configuration that the GdFeCo leakage magnetic field control layer 40 shown in FIG. 11 was absent was prepared. As apparent from FIG. 12, when the thickness of the exchange coupling control layer 48 is about 10 nm, the medium noise is substantially the same as that of the recording medium in Comparison, and when the thickness of the layer 48 is greater than 10 nm, the medium noise becomes larger than that of the recording medium in Comparison. Accordingly, it is preferable to set the thickness of the exchange coupling control layer 48 to not greater than 10 nm. As the exchange coupling control layer 48, a single-element film of metalloid such as boron (B), carbon (C), and silicon (Si) or an alloy film/oxide film containing at least one kind of metalloid may be used. Also in this case, a qualitatively similar result is obtained.

According to the present invention, it is possible to provide a perpendicular magnetic recording medium which can suppress the influence of leakage magnetic fields from the backing layer and the recording layer to thereby reduce the medium noise.

What is claimed is:

1. A perpendicular magnetic recording medium comprising:

a substrate;

a soft-magnetic backing layer provided on said substrate;

a single ferromagnetic recording layer provided on said soft-magnetic backing layer, said ferromagnetic recording layer having perpendicular magnetic anisotropy; and a ferrimagnetic layer provided on said ferromagnetic recording layer, said ferrimagnetic layer exhibiting magnetization opposite to the magnetization of said ferromagnetic recording layer in its magnetized condition, said ferrimagnetic layer being formed from a rare earth-transition metal amorphous alloy film.

2. A perpendicular magnetic recording medium according to claim 1, wherein said rare earth-transition metal alloy film contains Gd as a rare earth metal.

3. A perpendicular magnetic recording medium according to claim 1, wherein said ferrimagnetic layer has a thickness of 20 nm or less.

4. A perpendicular magnetic recording medium according to claim 1, further comprising an exchange coupling control layer interposed between said ferromagnetic recording layer and said ferrimagnetic layer.

5. A perpendicular magnetic recording medium according to claim 4, wherein said exchange coupling control layer has a thickness of 10 nm or less.

6. A perpendicular magnetic recording medium according to claim 1, wherein said ferromagnetic recording layer is formed from a multilayer film of a material selected from the group consisting of Co/Pd, Co/Pt, and CoB/PdB or a multilayer oxide film of said material.

* * * * *